United States Patent [19]

Bódás et al.

[11] Patent Number: 5,078,205
[45] Date of Patent: Jan. 7, 1992

[54] COOLING SYSTEM FOR CONDENSING THE EXHAUST STEAM OF STEAM TURBINE PLANTS, PARTICULARLY OF POWER PLANTS

[75] Inventors: János Bódás; István Papp, both of Budapest, Hungary; Georgy S. Ageiev; Anatoly F. Diakov, both of Moscow, U.S.S.R.; Hermes R. Santurian, Yerevan, U.S.S.R.; Sergei G. Trushin, Moscow, U.S.S.R.

[73] Assignee: Energiagazdalkodasi Intezet, Budapest, Hungary

[21] Appl. No.: 347,294

[22] Filed: May 3, 1989

[30] Foreign Application Priority Data

May 10, 1988 [HU] Hungary ............................. 2351/88

[51] Int. Cl.⁵ ............................. F28B 3/04; F28C 1/14
[52] U.S. Cl. ................................... 165/110; 165/125; 165/900; 261/153; 261/DIG. 11
[58] Field of Search ................... 165/125, 900, 104.31, 165/110, 124; 261/DIG. 77, DIG. 11, 153

[56] References Cited

U.S. PATENT DOCUMENTS

| | | | |
|---|---|---|---|
| 3,731,461 | 5/1973 | Hamon | 261/DIG. 77 |
| 4,076,771 | 2/1978 | Houx, Jr. et al. | 165/900 |
| 4,098,854 | 7/1978 | Knirsch et al. | 165/900 |
| 4,315,873 | 2/1982 | Smith et al. | 261/DIG. 77 |
| 4,747,980 | 5/1988 | Babay et al. | 261/DIG. 11 |
| 4,893,669 | 1/1990 | Kashiwada et al. | 261/DIG. 77 |

FOREIGN PATENT DOCUMENTS 220607 5/1987 European Pat. Off. .

Primary Examiner—Albert W. Davis, Jr.
Attorney, Agent, or Firm—Jordan and Hamburg

[57] ABSTRACT

A cooling system for condensing the exhaust steam of steam turbine plants, particularly of power plants, comprises a mixing condenser connected to the outflow of the steam turbine, a dry cooling tower connected to the cooling water circuit of the mixing condenser, and a wet cooling apparatus provided inside the cooling tower.

Although wet cooling apparatus seem to be suitable to additionally increase the cooling performance of the cooling tower and, thereby, its effective operation even in case of exceptionally high ambient temperatures, the air exiting from them is cooler than the air flowing in through the main heat exchangers of the cooling tower and, therefore, the draft of the latter suffers deterioration when the two air streams mix one with the other. It means that the effectiveness of complementary cooling is may be impaired. Such difficulty is eliminated by locating the wet cooling apparatus at least partly in a box for conducting cooling air from the ambient into the cooling tower, the box being arranged inside the cooling tower and encompassing a dry surface heat exchanger provided after the wet cooling apparatus as regards the flow direction of cooling air. The air exiting from the wet cooling apparatus becomes warmed up while traversing the dry surface heat exchanger and, thus, does not diminish the draft of the cooling tower when mixing with the air flowing in through the main heat exchangers of the latter.

9 Claims, 4 Drawing Sheets

COOLING SYSTEM FOR CONDENSING THE EXHAUST STEAM OF STEAM TURBINE PLANTS, PARTICULARLY OF POWER PLANTS

BACKGROUND OF THE INVENTION

This invention relates to cooling systems for condensing the exhaust steam of steam turbine plants, particularly of power plants.

Cooling systems of the above specified type generally consist of a mixing condenser connected to the outflow of the steam turbine of the plant and of a cooling tower connected to the cooling water circuit of the mixing condenser. So called dry cooling towers circulate the cooling or return water of the mixing condenser of the steam turbines through the water side of an air-water heat exchanger and perform the cooling by means of air introduced from the ambient. Their employment in case of power plants at arid sites is particularly advantageous. Then cooling effect is determined by the dry temperature of air which sets limits to cooling performance. In especially warm environments the cooling performance may fail to meet the cooling requirements of the power plant and, thus, may entail a reduction of its output.

The main object of the present invention is to avoid such deficiencies and to provide a cooling system the dry cooling tower of which is capable to reliably meet the cooling requirements even at especially high ambient temperatures without the necessity of increasing the size of the cooling tower. This is obtained by complementing the dry cooling with wet cooling if necessary where the cooling effect is determined by the wet temperature of air. Such temperature may be substantially lower than the dry temperature of air and, thus, may yield relatively much higher cooling effects.

The complementary wet cooling is ensured by a wet cooling apparatus arranged inside the cooling tower.

Dry cooling towers with interior wet cooling apparatus are already known. Such system is described e.g. in the specification of Hungarian patent No. 193 135. For warming up the air flowing through the wet cooling apparatus a tunnel-like box is provided inside the cooling tower, the inlet opening of which opens into the ambient while its outlet opening opens into the space inside the cooling tower. The wet cooling apparatus is located between these two openings. However, the system described there is but moderately suitable to increase the cooling effect at good efficiency. Viz., the air current cooled by the dry heat exchangers—hereinafter called "main" heat exchangers—of the cooling tower becomes mixed inside the cooling tower with the air exiting from the wet cooling apparatus. As is known, such mixing entails, as a rule, decreased resultant air temperatures by which the draft of the cooling tower deteriorates and its cooling action diminishes. In extreme cases the additional or complementary cooling action of the wet cooling apparatus may entirely be impaired.

SUMMARY OF THE INVENTION

Such difficulty is eliminated by the present invention the key idea of which consists in warming up the air coming from the wet cooling apparatus prior to its mixing with the air flowing in through the main heat exchangers to the temperature of the latter. For such purpose, between the wet cooling apparatus and the outlet opening of the box there is a dry heat exchanger connected to the cooling water circuit of the condenser of the steam turbine and serving for warming up the air supplied by the complementary wet cooling apparatus to the temperature of the air flowing into the cooling tower through the main heat exchangers. Obviously, the dry heat exchanger could be connected to other cooling medium circuit than that of the condenser as well. Basically, the air exiting from the wet cooling apparatus is warmed up by means of transmitting the heat of a medium circulating therein which is cooled down thereby. The cooling or return water of the condenser is obviously the first candidate to be selected as such medium.

It will now be apparent that the new cooling system for condensing the exhaust steam of steam turbine plants, particularly of power plants, comprises, in a manner known per se, a mixing condenser with a cooling water circuit connected to the outflow of the steam turbine, a dry cooling tower connected to the cooling water circuit of the mixing condenser, through-type box or tunnel connecting the ambient with the inside of the cooling tower, and a wet cooling apparatus provided inside the tunnel. In accordance with the main feature of the invention, the box or tunnel encompassing a dry heat exchanger arranged behind the wet cooling apparatus as regards the flow direction of cooling air. Preferably, the dry heat exchanger is likewise connected to the cooling water circuit of the condenser.

As has been explained, the cooling system according to the invention ensures that mixing of the air flowing through the main heat exchangers of the cooling tower with the air exiting from the wet cooling apparatus thereby providing complementary cooling without decrease of temperature and, thus, the cooling performance of the cooling tower is increased without the necessity of increasing its size.

In the mouth of the box opening into the cooling tower a fan may preferably be provided for positively circulating the cooling air and, thereby, enhancing the efficiency of cooling.

The box may be provided with adjustable louvres arranged before the wet surface heat exchanger as regards the flow direction of cooling air and opening into the cooling tower. By adjusting the louvres, the temperature of the air sucked in from the ambient may be influenced and optimum cooling conditions may be obtained.

The wet cooling apparatus may be constituted by a wet surface heat exchanger arranged for cooperation with a set of spray nozzles connected to a water storage basin beneath the wet surface heat exchanger. In a manner known per se such arrangement permits the use of water of inferior quality as return water and, thereby, decrease of operational costs.

The wet surface heat exchanger may be located below the dry surface heat exchanger. By such arrangement favorable exploitation of space will be rendered possible because the set of nozzles associated with the wet surface heat exchanger may be placed in the area between the dry and wet surface heat exchangers.

However, the wet surface heat exchanger may also be arranged beside rather than below the dry surface heat exchanger while the box is provided with partitions for baffling the cooling air so that the cooling air strikes the wet surface heat exchanger from above. Then, the cooling air flows in the same direction as the water exiting from the set of spray nozzles which facilitates the forming of a uniform water film of increased cooling action. It is necessary only to provide the box with partitions which prevent the cooling air from bypassing the wet surface heat exchanger by turning aside from the course traversing the latter in vertically downward direction.

The set of spray nozzles of the wet surface heat exchanger is, as a rule, connected to the cooling water circuit of the mixing condenser in which case high quality return water is used for wetting the wet surface heat exchanger. At the same time the cooling water circuit may be connected through a water-water heat exchanger to a cooling basin arranged outside the cooling tower for cooperation with a set of spray nozzles. Such expedient permits use of water of lesser purity which means employment of cheap water for cooling purposes and, thereby, reduced operational costs. Return water for spraying the wet surface heat exchanger is used only when additional cooling of the cooling water of the condenser by means of the water-water heat exchanger already fails to satisfy actual cooling requirements.

Also, the wet cooling apparatus may be formed as a water spraying means arranged before the dry surface heat exchanger as regards the flow direction of cooling air in which case the water is sprayed into the air entering the dry surface heat exchanger. The advantage of such embodiment of the invention consists in that there is no water sprayed or wet surface heat exchanger so that water of lesser purity may be used for additional or complementary cooling which means, again, decreased operational costs.

The invention will be described hereinafter in greater detail by making reference to the accompanying drawing which shows, by way of example, preferred embodiments of the invention and in which:

BRIEF DESCRIPTION OF THE DRAWINGS

Same reference characters designate similar details throughout the drawings.

DETAILED DESCRIPTION OF PREFERRED EMBODIMENTS OF THE INVENTION

Figure 1:
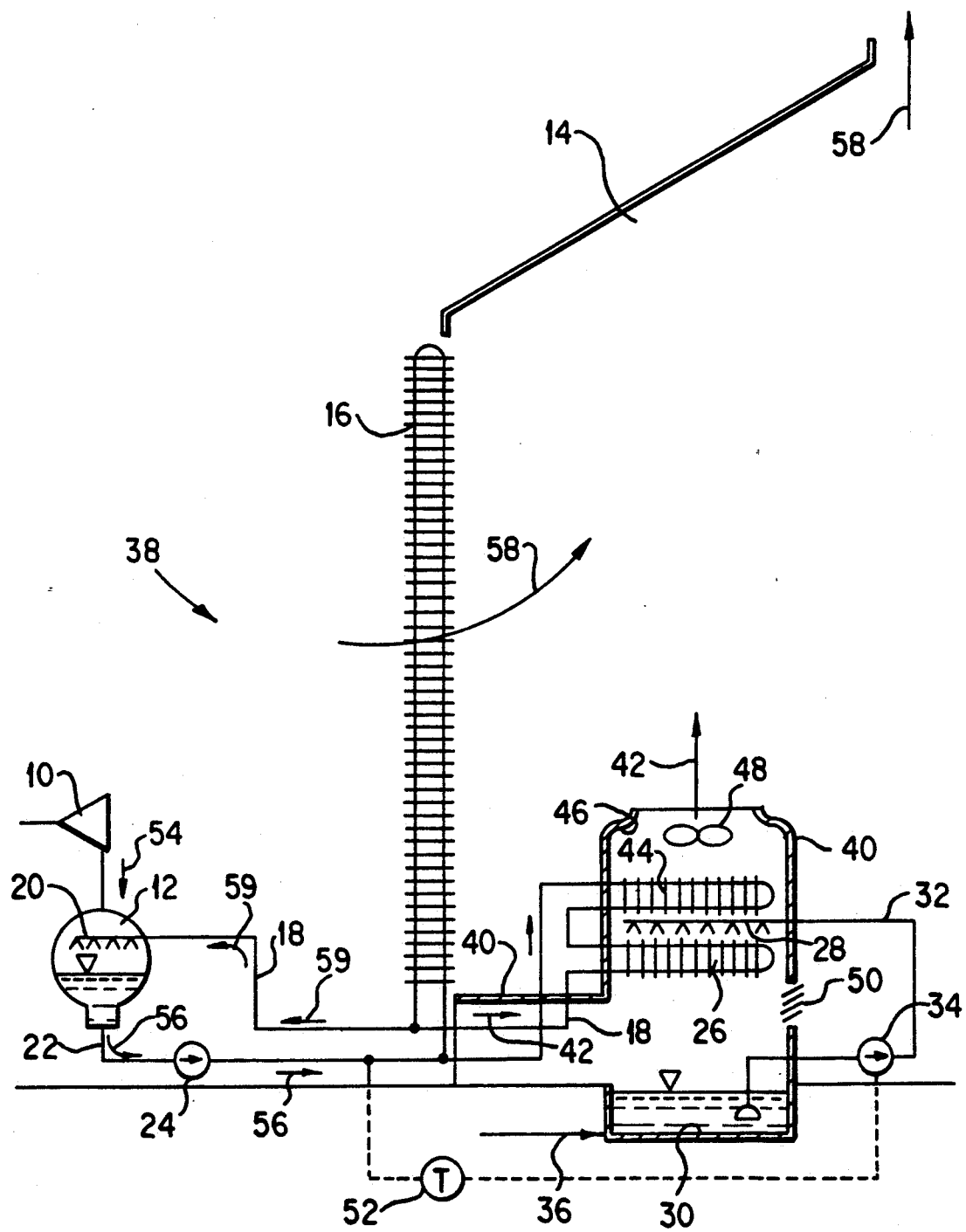
FIG. 1 shows in largely diagrammatic form the layout of an exemplary embodiment of the present invention.

In the drawings reference numeral 10 designates a steam turbine the exhaust steam of which is condensed in a mixing condenser 12. The return water of the condenser 12 circulating in closed circuit, is cooled down by the main heat exchangers 16 of a cooling tower 14 operated with natural draft.

The inflow and outflow of the main heat exchangers 16 are connected to a set of nozzles 20 in and with the outflow of condenser 12 by pipe conduits 18 and 22, respectively.

Return water is circulated by a pump 24 in pipe conduit 22.

Inside the cooling tower 14 there is a wet operation cooling apparatus. It consists, essentially, of a wet surface heat exchanger 26, a set of nozzles 28 for wetting the surface of the former, a pipe conduit 32 connecting the set of nozzles 28 with the cooling water storage area of a basin 30, and of a pump 34 supplying water from the basin 30 into the set of nozzles 28. The basin 30 lies beneath the wet surface heat exchanger 26 so that water trickling down from the latter comes back into the former.

In accordance with the main feature of the present invention, essential parts of the above described cooling apparatus 28, 30, 32, 34, 36 are located in a per se know box or tunnel 40 inside the cooling tower 14 which forms an air passage for conducting cooling air from the ambient into the space inside the former. The box 40 has a dry surface heat exchanger 44 arranged in it which lies after the cooling apparatus 28, 30, 32, 34, 36 as regards the flow direction 42 of cooling air.

The heat exchangers 26 and 44 are connected in series. They work in parallel with the main heat exchangers 16 of the cooling tower 14 as regards both the water and air flows.

In the instant case, the wet surface heat exchanger 26 is located beneath the dry surface heat exchanger 44. The set of nozzles 28 lies between both heat exchangers 26 and 44 by which, as has been hinted at, considerable space can be saved.

Likewise in the instant case, there is a fan 48 in the mouth 46 of the box 40 opening into the internal space of the cooling tower 14 by which the cooling air is maintained in positive circulation thereby enhancing the effectiveness of cooling.

The box 40 is provided with louvres 50 through which air from the bottom part of the cooling tower 14 may be admixed with the air sucked in from the ambient before the air flow reaches the wet surface heat exchanger 26. For such purpose, the louvres 50 are arranged before the wet surface heat exchanger 26 as regards the flow direction 42 of cooling air.

Pump 34 is operated in dependence of the temperature of the return water circulating in the pipe conduit 22, and its operation is triggered by a thermal sensor 52 connected to the pipe conduit 22.

In operation, the exhaust steam of steam turbine 10 flows, in the direction of arrow 54, into the mixing condenser 12 where it condenses by mixing with the return water sprayed in through the set of nozzles 20.

The mixture of condensate and return water is supplied by pump 24 in the direction of arrows 56 through pipe conduit 22 into the main heat exchangers 16 and into the heat exchangers 26 and 44 where it is cooled down by the cooling air flowing in the direction of arrows 58 through the cooling tower 14 and in the direction of arrows 42 through the box 40.

The cooled down return water flows back in the direction of arrows 59 through pipe conduit 18 and the set of nozzles 20 anew into the condenser 12 where it serves for condensing the waste steam arriving from the steam turbine 10. It is warmed up thereby and withdraws through pipe conduit 22 whereupon the above described cooling process takes place again in continuous operation.

As long as the air flowing in from the ambient 38 is sufficiently cold for cooling down the return water that is for condensing the waste or exhaust steam of steam turbine 10 at a prescribed temperature, both heat exchangers 26 and 44 work with dry surfaces because the pump 34 in pipe conduit 32 is at standstill and, thus, the set of nozzles 28 does not wet the surface of wet surface heat exchanger 26.

However, when ambient temperatures are so high that the main heat exchangers 16 even together with heat exchangers 26 and 44 are unable to ensure the required manner of operation of condenser 12, —which means that the temperature of the return water flowing in the pipe conduit 22 exceeds the value set by thermal sensor 52—, pump 34 of wet cooling apparatus 28, 30, 32, 34, 36 receives a start signal from thermal sensor 52 and delivers water from basin 30 into the set of nozzles 28.

The cooling water withdrawing from the set of nozzles 28 floods the surface of heat exchanger 26 which now works with evaporation. Due to evaporation taking place on the surface of heat exchanger 26 the cooling action of the cooling apparatus is considerably increased and reaches a multiple value with respect to previous dry operation.

The relatively cooler air leaving heat exchanger 26 becomes warmed up in the course of traversing dry surface heat exchanger 44 and entails further cooling down of the return water withdrawing through pipe conduit 18.

Dimensions are selected so that the temperature of air traversing the dry surface heat exchanger 44 reaches the temperature of the air inflowing through the main heat exchangers 16 in the direction of arrows 58. Therefore, the draft of the cooling tower 14 is not deteriorated in spite of the above described additionalo or complementary cooling which is to be attributed to the employment of the dry surface heat exchanger 44 provided in accordance with the present invention.

If the temperature of the ambient and, therewith, of the return water falls below the value set by the thermal sensor 52, the pump 34 stops and the heat exchanger 26 works again in dry surface operation.

The exemplary embodiment shown in FIG. 2 differs from the previously described one in that the wet surface heat exchanger 26 is arranged beside rather than below the dry surface heat exchanger 44. Furthermore, the box 40 has intermediate partitions 60 and 61 by which the cooling air flowing in the direction of arrows 42 is baffled so as to strike the wet surface heat exchanger 26 from above. In other words, the heat exchangers 26 and 44 of the wet cooling apparatus are, as regards the flow direction 42 of the cooling air, located one after the other in horizontal longitudinal direction which means that the cooling air is caused by box 40 and its intermediate partitions 60 and 61 to traverse the wet surface heat exchanger 26 vertically downwards prior to traversing the dry surface heat exchanger 44 in upward vertical direction.

The wet cooling apparatus 28, 30, 32, 34, 36 is, in the instant case, placed entirely inside the box 40.

Figure 2:
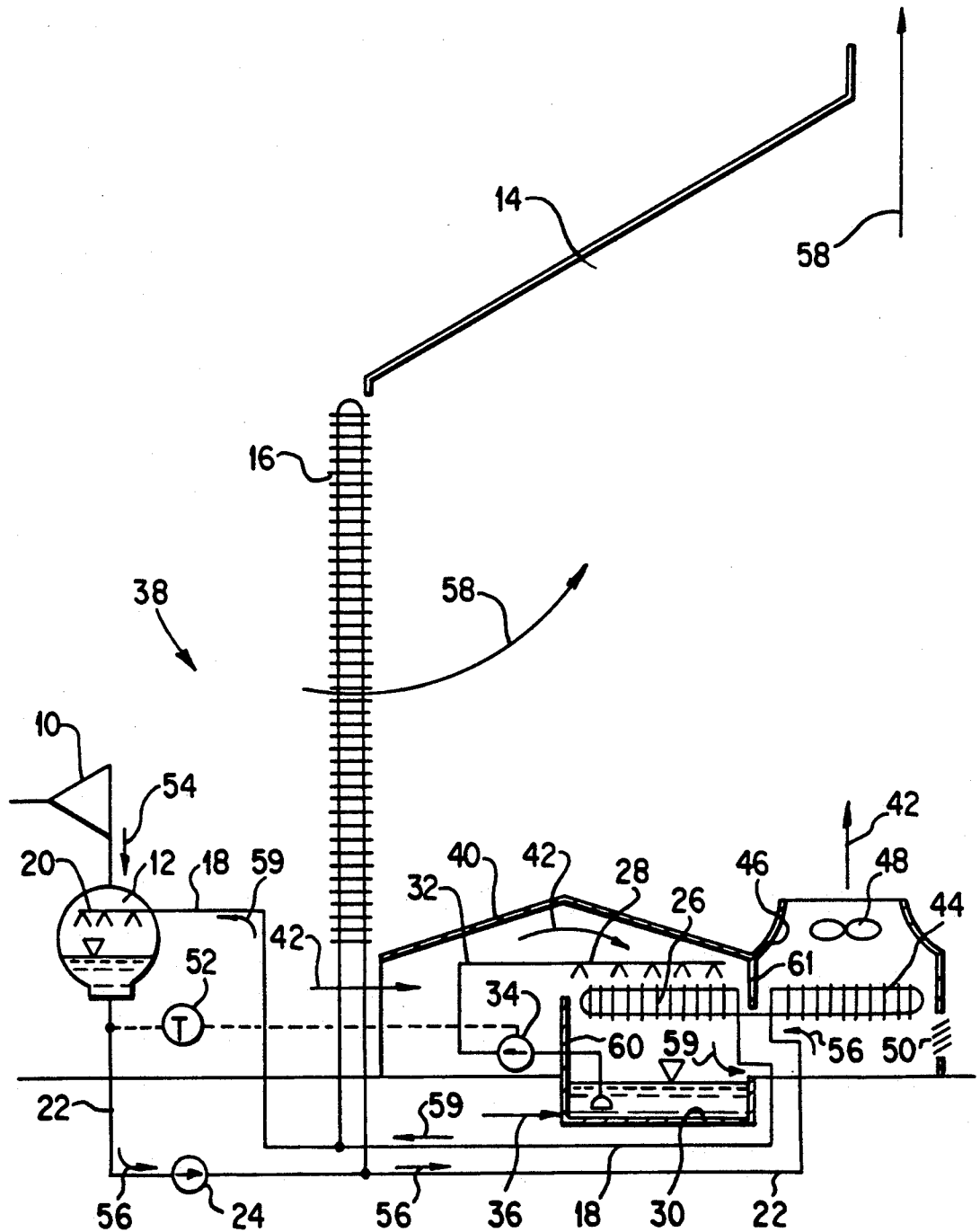
FIG. 2 is a similar illustration of another exemplary embodiment.

Due to the aforesaid differences as to arrangement and structure also operation of the embodiment according to FIG. 2 is slightly different from that of the previously described one. Namely, as has been hinted at, the cooling air flows unidirectionally, that is downwardly, with the wetting spray in the environment of wet surface heat exchanger 26. Consequently, forming of a water film covering the air swept surface all over and, thus, yielding increased cooling action is facilitated.

Figure 3:
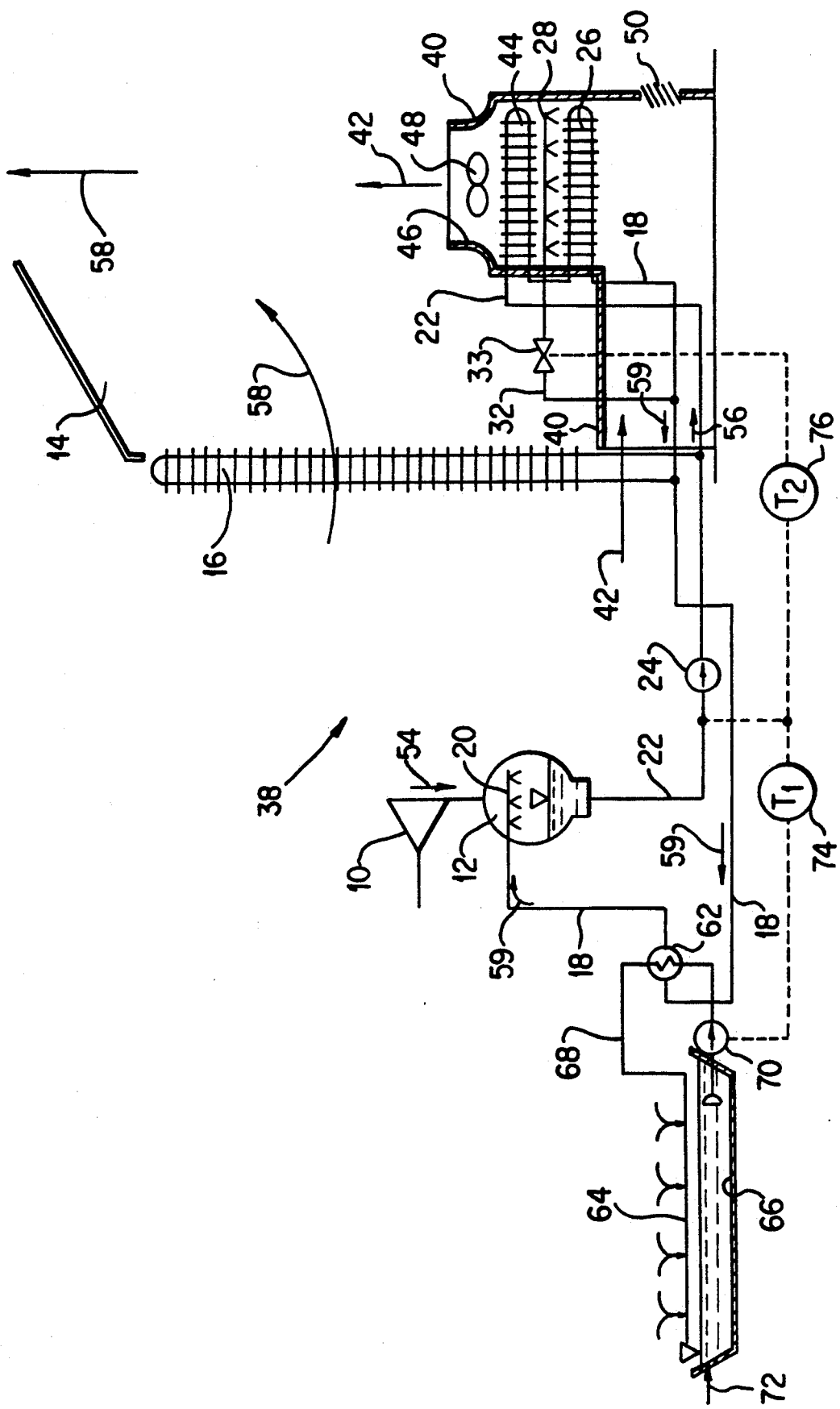
FIG. 3 represents the general arrangement of still another exemplary embodiment.

With the embodiment of the invention illustrated in FIG. 3, the set of nozzles 28 of the complementary cooling apparatus associated with the wet surface heat exchanger 26 is connected by pipe conduit 32 through a valve 33 to the cooling water circuit 18, 22 of the mixing condenser 12, more particularly, in the instant case, to its pipe conduit 18. The latter is, at the same time, connected through a water-water heat exchanger 62 to a set of nozzles 64 associated with a cooling basin 66 arranged beneath the set of nozzles 64 and outside the cooling tower 14. Cooling basin 66 is, by means of a pipe conduit 68, connected through the heat exchanger 62 to the set of nozzles 64. A pump 70 in the pipe conduit 68 delivers water from the basin 66 into the set of nozzles 64. Water loss of basin 66 is compensated through a feed line 72. Pump 70 receives starting signals from a thermal sensor 74 connected to the outflow pipe conduit 22 of the cooling water circuit of condenser 12.

A further thermal sensor 76 is likewise connected to pipe conduit 22 of condenser 12. Thermal sensor 76 to provide an operating device, not shown, of valve 33 in pipe conduit 32 feeding the set of nozzles 28 associated with wet surface heat exchanger 26 with a starting signal whenever wetting is required.

Thermal sensor 76 is set to a temperature $T_2$ which is higher than temperature $T_1$ to which thermal sensor 74 is adjusted.

In operation, with increasing ambient temperature first thermal sensor 74 triggers the operation of pump 70. Then, due to the spray from set of nozzles 64, basin 66 receives cooled down water which is circulated by pump 70 through heat exchanger 62.

Water coming from the main heat exchangers 16 of cooling tower 14 and from heat exchangers 26 and 44 is further cooled down by heat exchanger 62 whereby increase of the ambient temperature is suitably balanced.

If the temperature of the cooling water circulating in the cooling water circuit 18, 22 of condenser 12 further increases and reaches the temperature $T_2$ to which thermal sensor 76 is adjusted, valve 33 opens and, thus, part of the cooling water flowing in pipe conduit 18 reaches, through set of nozzles 28, the surface of wet surface heat exchanger 26 on which, now, the water is evaporated.

As has been mentioned, the advantage of such solution consists in that but relatively small amounts of expensive return water are evaporated while the cooling apparatus 64, 66, 68, 70, 72 performing the bulk of complementary cooling may be operated with cheap, pretreated or else uncleaned rough water.

Figure 4:
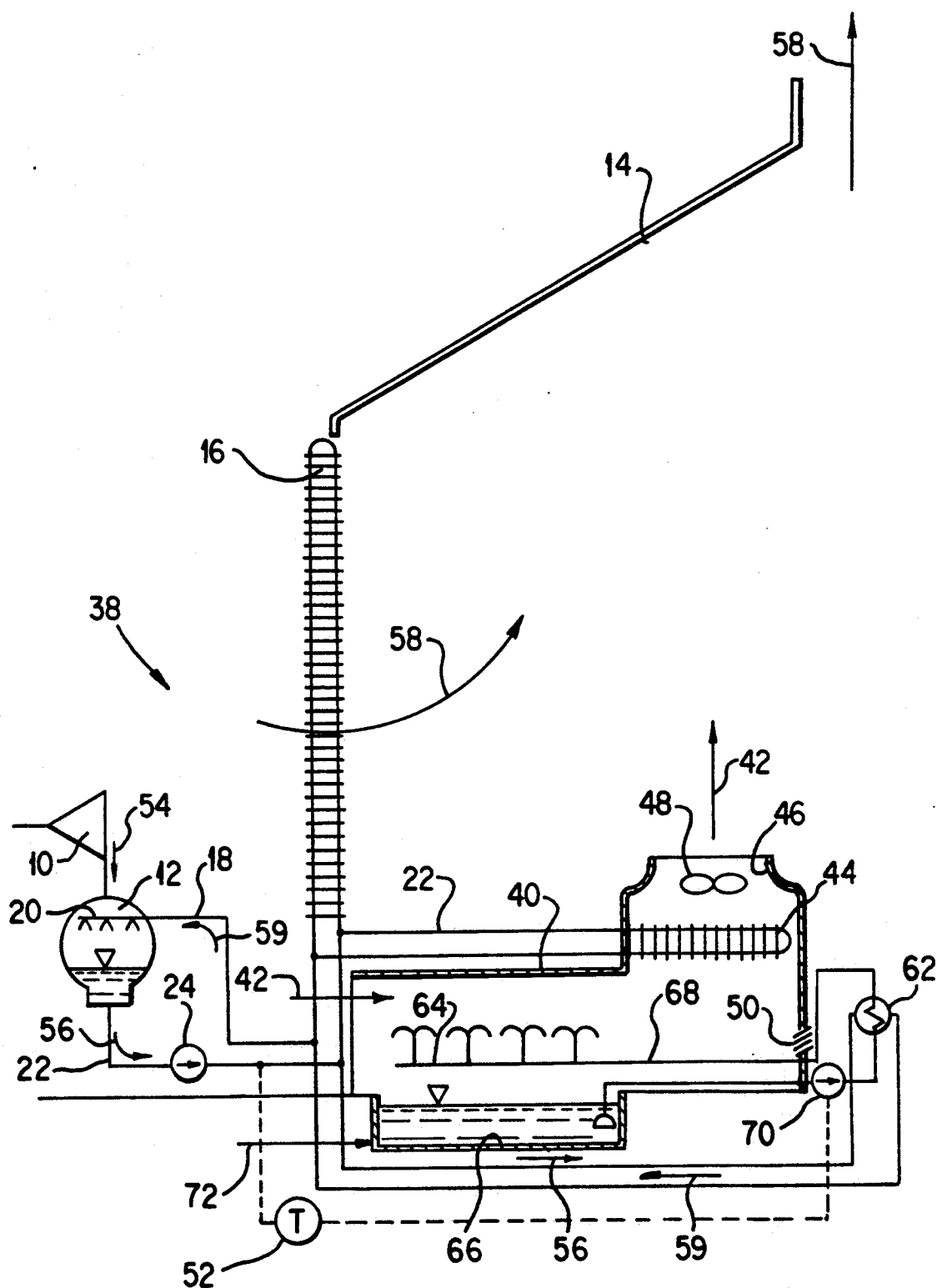
FIG. 4 illustrates a further exemplary embodiment in a similar manner.

In case of the exemplary embodiment of the present invention represented in FIG. 4, the complementary cooling apparatus is formed as a cooling basin 66 associated with a set of spray nozzles 64 and arranged before the dry surface heat exchanger 44 as regards the flow direction 42 of the cooling air. Otherwise, its structure corresponds to the cooling apparatus 64, 66, 68, 70, 72 of the previously described embodiment. It is, however, arranged partly inside the box 40 and entirely inside the cooling tower 14.

In operation, when the temperature of the ambient 38 exceeds the temperature T to which thermal sensor 52 is set, pump 70 is started and water is delivered by it from basin 66 through heat exchanger 62 into the set of nozzles 64. Sprayed in water partly evaporates due to which the remainder of water drops down into basin 66 in a cooled down state. By such relatively cooler water the cooling water circulating in the cooling water circuit 18, 22 of condenser 12 is cooled in heat exchanger 62 which means an addition to the cooling action of main heat exchangers 16 and of heat exchanger 44. Air flowing in direction of arrows 42 and having become wet due to spraying is warmed up while traversing dry surface heat exchanger 44, thereby causing further cooling down of the return water flowing in the cooling water circuit 18, 22.

In the course of warming up, such, as it were, secondary air reaches the temperature of the air traversing the main heat exchangers 16 in direction of arrows 58 which means that the draft of the cooling tower 14 will not suffer deterioration by mixing of the air withdrawing from the box 40 in direction of arrows 42 with the main stream.

An advantage of the instant solution consists in that there is no heat exchanger with sprayed surface and, thus, the cooling apparatus 64, 66, 68, 70, 72 may be operated also with water of increased salt content, that is with water of inferior quality as regards purity.

Hereinbefore, the invention was described without various auxiliary equipment such as control and starting units, etc., generally employed in such cooling systems as discussed above. However, employment of such devices being well known to the skilled art worker, disclosure of the invention would have been rendered unnecessarily intricate by their illustration and description.

In the represented embodiments the dry cooling tower 14 was illustrated with natural draft. It will, however, be apparent that the cooling tower proper might be provided with a fan as was the case with the box 40 and as is well known with current cooling towers.

On the other hand, the fan 48 in the mouth 46 of box 40 may be dispensed with which means that the box 40 may, for whatever reasons, work with natural draft as well. Such alternatives are basically independent from the invention as such. They equally ensure the advantage accompanying the invention, that is an increase of the cooling action of dry cooling towers by means of additional or complementary cooling and, thereby, an enhancement of their cooling performance without enlargement of their size which may be of decisive importance as regards their investment costs.

We claim:

1. Cooling system for condensing the exhaust steam of a steam turbine plant comprising
    a mixing condenser connectable to the outflow of the steam turbine,
    a cooling water circuit connected to said mixing tower,
    a cooling tower having main dry surface heat exchange means for heat exchange between the cooling water of said cooling water circuit and a primary air stream from the ambient through said cooling tower,
    a tunnel located inside said cooling tower for conducting a secondary air stream from the ambient into the interior of said cooling tower through an outlet of said tunnel,
    wet cooling means within said tunnel,
    a secondary dry surface heat exchange means connected in parallel with said main dry surface heat exchange means, said secondary dry surface heat exchange means being located within said tunnel between said wet cooling means and said outlet of said tunnel for warming up said secondary air stream prior to intermixing of said primary and secondary air streams within said cooling tower.

2. Cooling system as claims in claim 1, in which said wet cooling means are constituted by a wet surface heat exchanger arranged for cooperation with a set of spray nozzles connected to a water storage basin beneath said wet surface heat exchanger.

3. Cooling system as claimed in claim 2, in which said wet surface heat exchanger is arranged beneath said secondary dry surface heat exchange means.

4. Cooling system as claimed in claim 2, in which said wet surface heat exchanger is arranged beside said secondary dry surface heat exchange means, and said tunnel is provided with partitions for baffling said secondary air stream so as to strike said wet surface heat exchanger from above.

5. Cooling system as claimed in claim 2, in which said wet surface heat exchanger is connected in series with said secondary dry surface heat exchange means.

6. Cooling system as claimed in claim 1, in which said wet cooling means are constituted by a wet surface heat exchanger arranged for cooperation with a set of spray nozzles connected to said cooling water circuit, said cooling water circuit being connected through a water-water heat exchanger with a cooling basin arranged outside said cooling tower for cooperation with another set of spray nozzles.

7. Cooling system as claimed in claim 1, in which said wet cooling means consist of a water spraying means arranged before said secondary dry surface heat exchange means as regards the flow direction of said secondary air stream, said water spraying means being connected to a cooling basin beneath said water spraying means.

8. Cooling system as claimed in claim 1, in which said wet cooling means are constituted by a wet surface heat exchanger arranged beneath said secondary dry surface heat exchange means in said tunnel, a set of spray nozzles is provided in the area between said secondary dry surface heat exchange means and said wet surface heat exchanger, said set of spray nozzles being connected to one side of a water-to-water heat exchanger in a return conduit of said cooling water circuit, the other side of said water-to-water heat exchanger being closed through a cooling circuit including another set of water spray nozzles.

9. Cooling system as claimed in claim 1, in which the return conduit of said cooling water circuit comprises one side of a water-to-water heat exchanger the other side of which is closed through said wet cooling means including a set of water spray nozzles within said tunnel located between an inlet of the tunnel and said secondary dry surface heat exchange means.

* * * * *